(12) United States Patent
Lee

(10) Patent No.: US 8,094,321 B2
(45) Date of Patent: Jan. 10, 2012

(54) PHOTOGRAMMETRIC TARGET AND RELATED METHOD

(75) Inventor: Nien L. Lee, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 989 days.

(21) Appl. No.: 12/037,737

(22) Filed: Feb. 26, 2008

(65) Prior Publication Data

US 2009/0214106 A1 Aug. 27, 2009

(51) Int. Cl.
*G01B 11/30* (2006.01)
*G01B 11/24* (2006.01)
*G06K 9/00* (2006.01)

(52) U.S. Cl. ........................ 356/602; 382/154
(58) Field of Classification Search .................. 356/602, 356/620; 382/154
See application file for complete search history.

(56) References Cited

U.S. PATENT DOCUMENTS

| | | | |
|---|---|---|---|
| 4,349,277 A | 9/1982 | Mundy et al. | |
| 4,647,208 A | 3/1987 | Bieman | |
| 4,926,563 A | 5/1990 | Smith | |
| 5,073,005 A | 12/1991 | Hubbs | |
| 5,216,476 A | 6/1993 | Lanckton | |
| 6,388,756 B1 | 5/2002 | Ho et al. | |
| 6,650,764 B1 * | 11/2003 | Wakashiro | 382/103 |
| 6,826,299 B2 | 11/2004 | Brown et al. | |
| 6,836,377 B1 | 12/2004 | Kislev et al. | |
| 7,016,052 B2 | 3/2006 | Bloch et al. | |
| 7,110,194 B2 | 9/2006 | Hubbs | |
| 7,145,647 B2 | 12/2006 | Suphellen et al. | |
| 7,187,454 B2 | 3/2007 | Matsutori | |
| 7,206,080 B2 * | 4/2007 | Kochi et al. | 356/611 |
| 7,298,890 B2 * | 11/2007 | Massen | 382/154 |
| 2004/0150816 A1 | 8/2004 | Wakashiro et al. | |
| 2006/0227210 A1 | 10/2006 | Raab et al. | |
| 2006/0269124 A1 | 11/2006 | Harada et al. | |
| 2007/0153297 A1* | 7/2007 | Lau | 356/620 |
| 2008/0111985 A1* | 5/2008 | Bridges | 356/3.16 |

FOREIGN PATENT DOCUMENTS

WO   WO 02097362 A1 * 12/2002

* cited by examiner

*Primary Examiner* — Michael A Lyons
(74) *Attorney, Agent, or Firm* — Finnegan, Henderson, Farabow, Garrett & Dunner LLP

(57) ABSTRACT

A multi-target photogrammetric target assembly and related method of evaluating curvilinear surface character. The target assembly includes a first photogrammetric target disposed at a first support and a second photogrammetric target disposed at a second support. The first support and the second support are operatively connected such that the first target is in predefined lateral spaced relation to the second target. The method includes providing a structure having a curvilinear surface and affixing one or more multi-target photogrammetric target assemblies to the curvilinear surface. The position of the targets is measured by one or more imaging devices to define surface contour characteristics.

19 Claims, 5 Drawing Sheets

PHOTOGRAMMETRIC TARGET AND RELATED METHOD

TECHNICAL FIELD

This patent disclosure relates generally to photogrammetric targets for use in optical evaluation of surface contours and, more particularly, to photogrammetric target assemblies incorporating pairs of target structures disposed in spaced relation and adapted for placement on contoured surfaces to conduct measurement of those surfaces.

BACKGROUND

It is generally known to use light reflective targets in photogrammetric measurement of surfaces. According to this practice, the light reflective targets are positioned in a defined pattern on a surface to be measured and the positional relationship of the targets is measured and/or verified. Specifically, in a typical system, a measurement technician mounts multiple reflective targets on the surface to be measured and one or more cameras are then used to image the targets on a two-dimensional medium such as a film or a digital image sensor. A process of triangulation is then used to determine the relative three-dimensional positions of the targets. This permits development of a three dimensional image of the targeted surface. In the field of process control, such imaging may be used to compare the plotted positions of the targets on a formed part against a pre-established map of the specified formed part contours. This comparison is used to determine whether the formed part complies with given specification tolerances. One deficiency in such measurement systems is their dependence on manual placement of individual targets. In particular, in the event that the imaging technician fails to place targets properly the measurement will be in error.

Reflective targets for use in photogrammetric imaging are disclosed, for example, in U.S. Pat. No. 5,073,005 to Hubbs, having a filing date of May 2, 1988, and an issue date of Dec. 17, 1991. As best understood, this reference discloses target assemblies having a body with a mounted support surface adapted to hold a retro-reflective target. In one disclosed embodiment, the target body is elongated and provides a pair of target support surfaces at opposing ends. These target assemblies may be mounted on tooling or other surfaces for photogrammetric imaging evaluation. When using existing target assemblies, good results have been difficult to achieve due to difficulties in precisely aligning individual targets. Achieving good results may be particularly difficult when measuring surfaces such as boreholes and shaft surfaces.

SUMMARY

In accordance with one aspect, the present disclosure provides a photogrammetric target assembly. The target assembly includes a first photogrammetric target disposed at a terminal show surface of a first support pillar. The target assembly further includes a second photogrammetric target disposed at a terminal show surface of a second support pillar. The first support pillar and the second support pillar are operatively connected such that the first photogrammetric target is in predefined lateral spaced relation to the second photogrammetric target.

In accordance with another aspect, the present disclosure provides a method for measuring the contour of a curvilinear surface. The method includes providing a structure having a curvilinear surface and affixing a multi-target photogrammetric target assembly to the curvilinear surface. The photogrammetric target assembly includes a first photogrammetric target disposed at a terminal show surface of a first support pillar. The photogrammetric target assembly further includes a second photogrammetric target disposed at a terminal show surface of a second support pillar. The first support pillar and the second support pillar are operatively connected such that the first photogrammetric target is in predefined lateral spaced relation to the second photogrammetric target. The position of the first photogrammetric target and the second photogrammetric target are measured relative to one another.

DETAILED DESCRIPTION

As will be described further hereinafter, an improved photogrammetric target assembly is provided. The improved assembly includes a pair of reflective photogrammetric targets disposed at terminal show surfaces of operatively connected and laterally spaced supports. The improved assembly is adapted for measurement of curvilinear surfaces.

Figure 1:
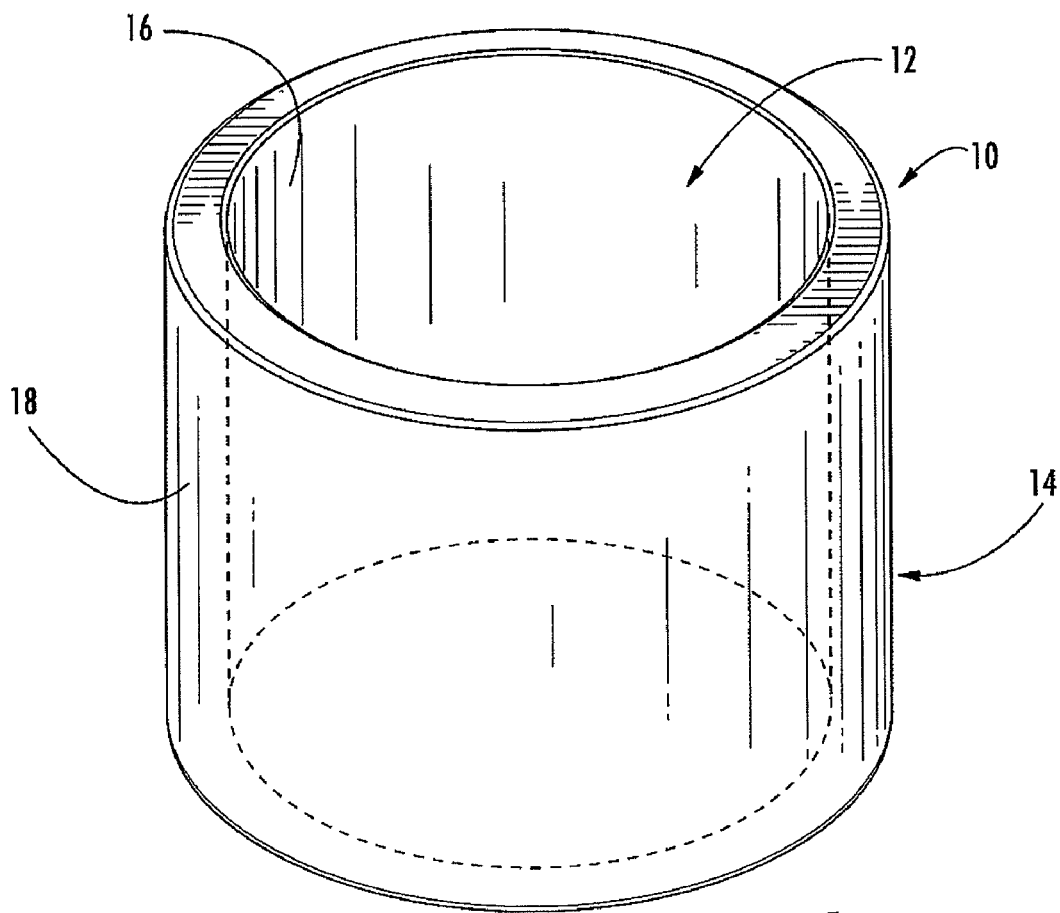
FIG. 1 is a schematic view illustrating a cylindrical open bore structure.

Reference will now be made to the drawings, wherein to the extent possible, like elements are designated by like reference numerals throughout the various views. FIG. 1 illustrates an exemplary formed structural element 10 of curved surface geometry. The illustrated structural element 10 is in the form of an open bore cylinder including an axial bore 12 and a surrounding body 14 extending in ring-forming relation around the axial bore 12. The structural element 10 illustrated in FIG. 1 includes an inner curved surface 16 defining the boundary between axial bore 12 and body 14. The illustrated structural element 10 also includes an outer curved surface 18 defining the exterior of body 14.

It is to be understood and appreciated that the illustrated structural element 10 is exemplary only and is provided to generally illustrate structures of three-dimensional curved surface geometry as may be measured by target assemblies and measurement techniques consistent with the present disclosure as described more fully below. Accordingly, while open cylindrical structures such as the structural element 10 illustrated in FIG. 1 may be well-suited for measurements using such target assemblies and techniques, other structures of curved surface geometry are likewise suitable for measurement by such target assemblies and techniques.

Figure 2:
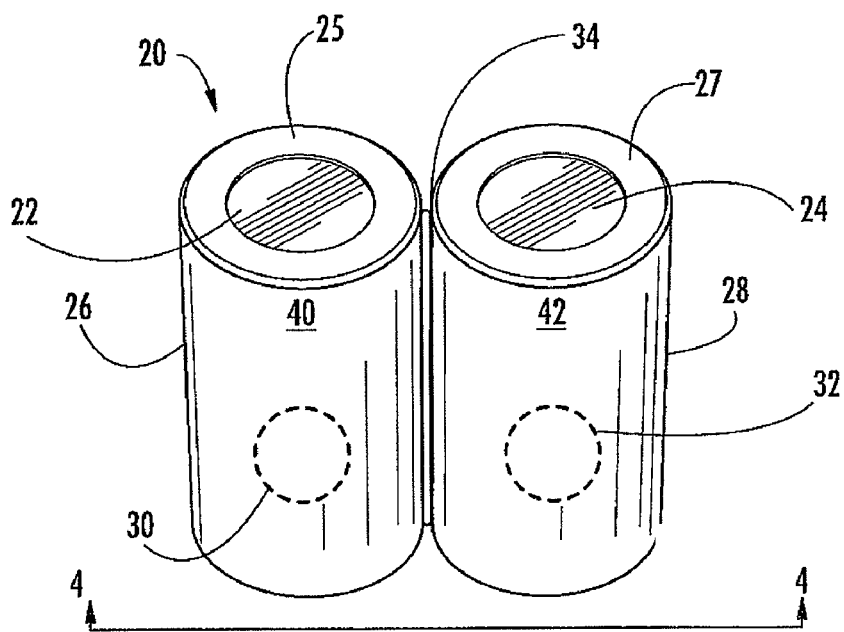
FIG. 2 is a schematic view illustrating a photogrammetric target assembly incorporating a cooperative pair of target structures adapted for placement across a curved surface.

FIG. 2 illustrates an exemplary target assembly 20 of dual pillar construction adapted for use in photogrammetric measurement of curved surface structures. As shown, in the embodiment illustrated in FIG. 2, the target assembly includes a first reflective target 22, and a second reflective target 24. The first reflective target 22 is mounted in substantially centered relation at a first terminal show surface 25 disposed at one end of a first support pillar 26. Likewise, the second reflective target 24 is mounted in lateral relation to the first reflective target 22 at a second terminal show surface 27 disposed at one end of a second support pillar 28. In the illustrated target assembly 20, a first attachment element 30 is located at an outer surface of first support pillar 26. A second attachment element 32 may be located at the outer surface of second support pillar 28. Additional attachment elements may likewise be utilized if desired.

According to one contemplated practice, the first attachment element 30 and the second attachment element 32 may be in the form of magnets to provide a releasable attachment connection with a structural element 10 of ferrous or other material characterized by magnetic attraction. However, it is also contemplated that other attachment systems such as adhesive systems and the like may be utilized if desired. It is also contemplated that combinations of different attachment systems may be utilized if desired. Moreover, while first support pillar 26 and second support pillar 28 are illustrated as having single attachment elements, it is likewise contemplated that multiple attachment elements may be utilized if desired.

According to the illustrated exemplary construction, first support pillar 26 and second support pillar 28 incorporate bodies of substantially circular cross-sectional geometry adjoined by a connector 34 such as a molded-in bridge or the like disposed at one or more positions along their lengths. In this regard, although first support pillar 26 and second support pillar 28 are each illustrated as having a generally circular cross-section, it is likewise contemplated that other cross-sectional geometries may also be utilized if desired. The support pillars 26, 28 and connector 34 may be formed of similar or dissimilar materials. By way of example only, and not limitation, each of the support pillars 26, 28 and connector 34 may be formed from moldable plastic. However, metals and other materials of construction may likewise be utilized if desired.

Regardless of the cross-sectional geometry of the support pillars, it is contemplated that bodies of the support pillars may be characterized by curved outer surfaces such that first support pillar 26 presents a first lobed surface 40 of convex curved profile and second support pillar 28 presents a second lobed surface 42 of convex curved profile. As best illustrated through simultaneous reference to FIGS. 2 and 4, the lobed surfaces 40, 42 may be disposed in spaced-apart, lateral relation on either side of connector 34 such that connector 34 provides a connection spanning the cusp between the first lobed surface 40 and the second lobed surface 42. The spaced lobed surfaces 40, 42 cooperatively define a double lobed face 44 adapted for placement in contacting relation across a curved surface to be evaluated as described further hereinafter.

Figure 3:
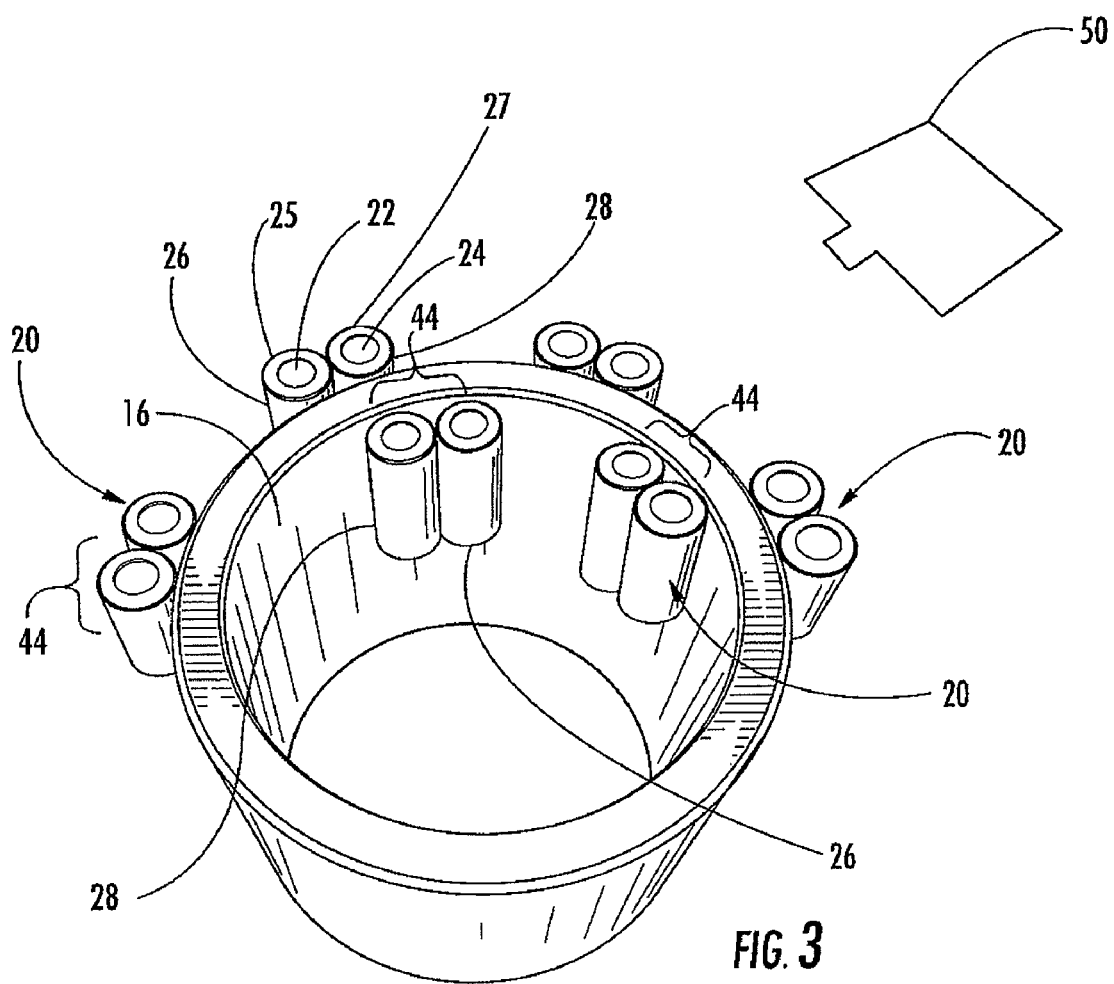
FIG. 3 is a schematic view illustrating placement of the target assembly of FIG. 2 around the interior and exterior walls of the cylindrical open bore structure of FIG. 1.

As noted previously, target assembly 20 may be used as part of a photogrammetric system to evaluate the configuration of curved surfaces in formed parts. In this regard, target assembly 20 is adapted for use in the evaluation of surface structures of convex or concave configuration. By way of example only, and not limitation, FIG. 3 illustrates the placement of a plurality of target assemblies 20 around the inner wall and outer wall of a structural element 10 having a substantially tubular construction as previously described in relation to FIG. 1. As shown, the double lobed faces 44 of target assemblies 20 are disposed in contacting relation to the substantially concave inner curved surface 16. The double lobed faces 44 of target assemblies 20 are also disposed in contacting relation to the substantially convex outer curved surface 18. The position of the target assemblies 20 is maintained by releasable attachment elements 30, 32 (FIG. 2) such as magnets or the like as previously described. Of course, it is to be understood that the actual arrangement of target assemblies 20 across the surfaces of structural element 10 is exemplary only. Thus, spacing and arrangement of target assemblies 20 can be varied as desired to evaluate a single surface or multiple surfaces within a structure.

Regardless of the nature of the structure being evaluated, target assemblies 20 may be arranged to present an array of reflective targets 22, 24 detectable by an imaging device 50 such as a camera adapted to record the relative positions of the targets 22, 24. The use of three or more targets may be utilized to define a reference plane. The use of substantial numbers of targets may be utilized in some instances to define complex surfaces. According to one exemplary process, imaging device 50 is used to image the targets on a two-dimensional medium such as a film or a digital image sensor. A process of triangulation is then used to determine the relative three-dimensional positions of the targets. The plotted positions of the targets on the formed parts may then be compared against a pre-established map of the specified formed part contours. A target having a position which is inconsistent with pre-established specifications indicates the presence of an irregularity at that target position.

The double pillar structure of target assembly 20 may facilitate placement of target assembly 20 across a surface to be evaluated in a manner which promotes self aligning relative to the curve being measured, In particular, the operatively connected, laterally-spaced support pillars may provide a pair of reflective targets 22, 24 in established spaced-apart relation thereby reducing variability in the measurement process. Moreover, the double lobed face 44 also allows the target assembly 20 to establish and maintain contact with curved surfaces.

Figure 5:
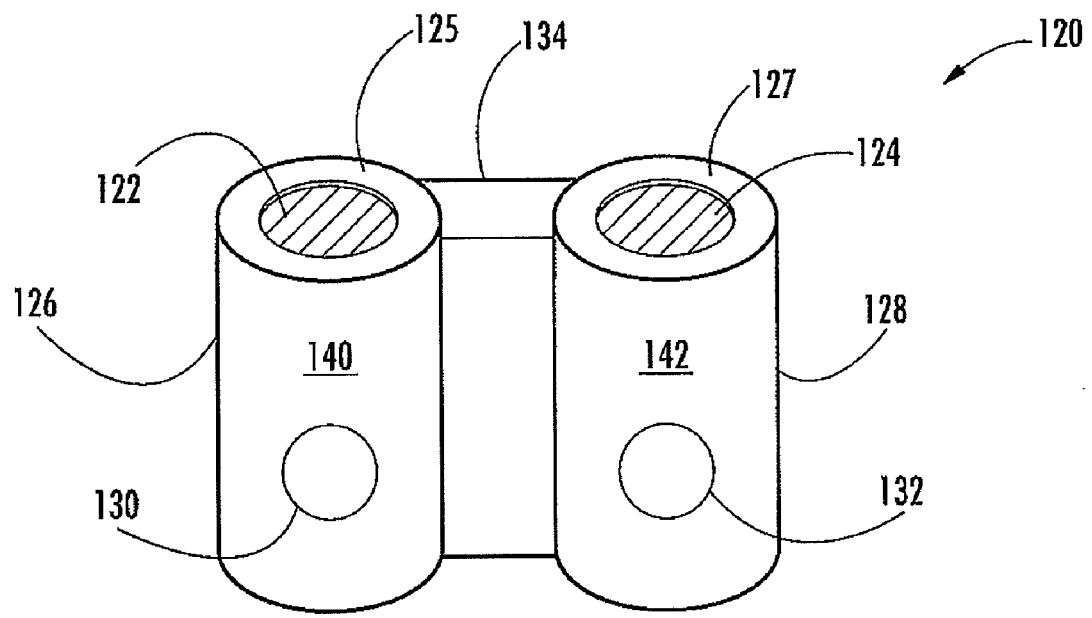
FIG. 5 is a schematic view similar to FIG. 2, illustrating another connective arrangement between photogrammetric target support structures.

A number of different physical constructions may characterize target assemblies consistent with this disclosure. By way of example only, and not limitation, FIG. 5 is a schematic view similar to FIG. 2, illustrating an alternative connective arrangement between photogrammetric target support structures. In FIG. 5, elements corresponding to those previously described are designated by like reference numerals within a 100 series. As shown, in the embodiment illustrated in FIG. 5, the target assembly 120 includes a first reflective target 122, and a second reflective target 124. The first reflective target 122 is mounted in substantially centered relation at a first terminal show surface 125 disposed at one end of a first support pillar 126. Likewise, the second reflective target 124 is mounted in lateral relation to the first reflective target 122 at a second terminal show surface 127 disposed at one end of a second support pillar 128.

According to the exemplary construction illustrated in FIG. 5, first support pillar 126 and second support pillar 128 incorporate bodies of substantially circular cross-sectional geometry adjoined by a connector 134 in the form of an extended width spacer. As in the configuration of FIG. 2, first support pillar 126 presents a first lobed surface 140 of convex curved profile and second support pillar 128 presents a second lobed surface 142 of convex curved profile. The lobed surfaces 140, 142 are disposed in substantially spaced-apart, lateral relation on either side of connector 134. The support pillars 126, 128 and connector 134 may be formed of similar or dissimilar materials. By way of example only, and not limitation, each of the support pillars 126, 128 and connector 134 may be formed from moldable plastic. However, metals and other materials of construction may likewise be utilized if desired.

Figure 4:
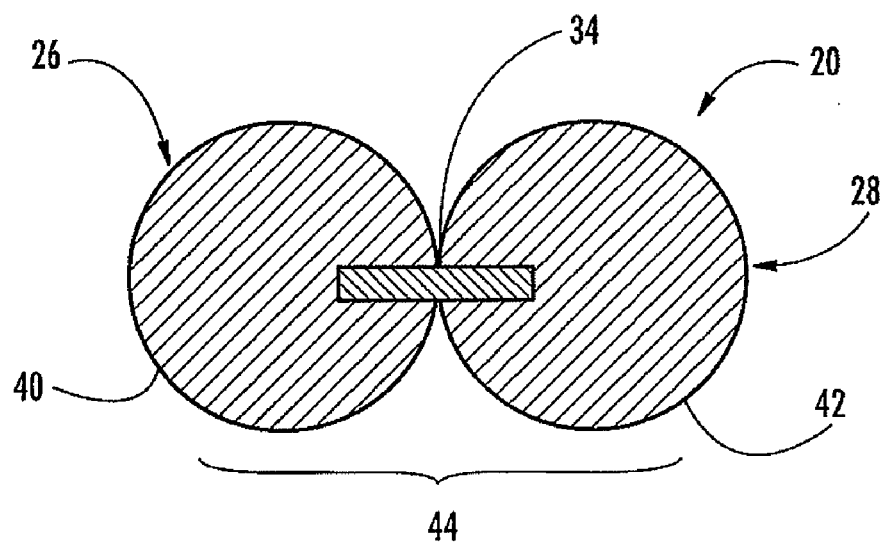
FIG. 4 is a schematic view taken generally along line 4-4 in FIG. 2, illustrating a potential connective relation between photogrammetric target support structures.
Figure 6:
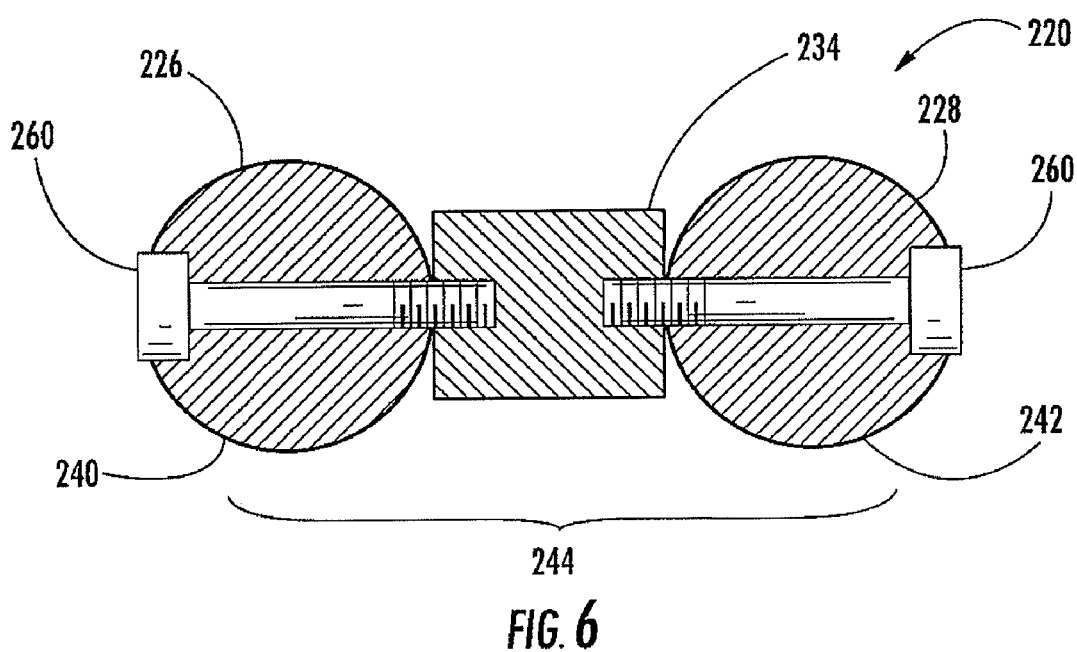
FIG. 6 is a schematic view similar to FIG. 4, illustrating another connective arrangement between photogrammetric target support structures.

By way of example only, and not limitation, FIG. 6 is a schematic view similar to FIG. 4, illustrating an alternative connective arrangement wherein elements corresponding to those previously described are designated by like reference numerals within a 200 series. In the construction of FIG. 6, the first support pillar 226 and the second support pillar 228 are operatively connected in spaced-apart relation using a substantially block shaped connector 234. As illustrated, the connector 234 is adapted to engage adjustable coupling members 260 such as bolts or the like to provide an operative connection between the connector 234 and the support pillars. As will be appreciated, in such a structure, the insertion length of the coupling members 260 into the connector may be adjusted thereby adjusting the span between first support pillar 226 and the second support pillar 228. Thus, the distance between the targets may be adjusted as desired.

Figure 7:
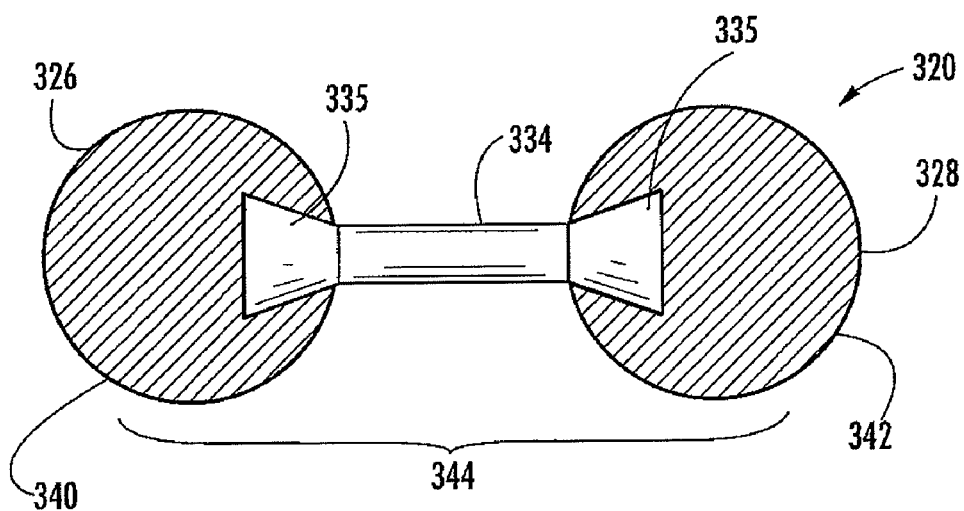
FIG. 7 is a schematic view similar to FIG. 4, illustrating yet another connective arrangement between photogrammetric target support structures.

FIG. 7 is a schematic view similar to FIG. 4, illustrating yet another alternative construction wherein elements corresponding to those previously described are designated by like reference numerals within a 300 series. In the construction of FIG. 7, the first support pillar 326 and the second support pillar 328 are operatively connected in spaced-apart relation using a substantially fixed length connector 334 such as a rod or the like. In the illustrated construction, the connector 334 includes a pair of flared ends 335. These flared ends may slidingly fit in dovetailed relation within opposing slots extending at least partially along the length of the support pillars 326, 328. As will be appreciated, such a structure may provide a substantially fixed span between first support pillar 226 and the second support pillar 228. Moreover, rods of different length may be interchanged. Thus, the distance between the targets may be adjusted as desired.

Figure 8:
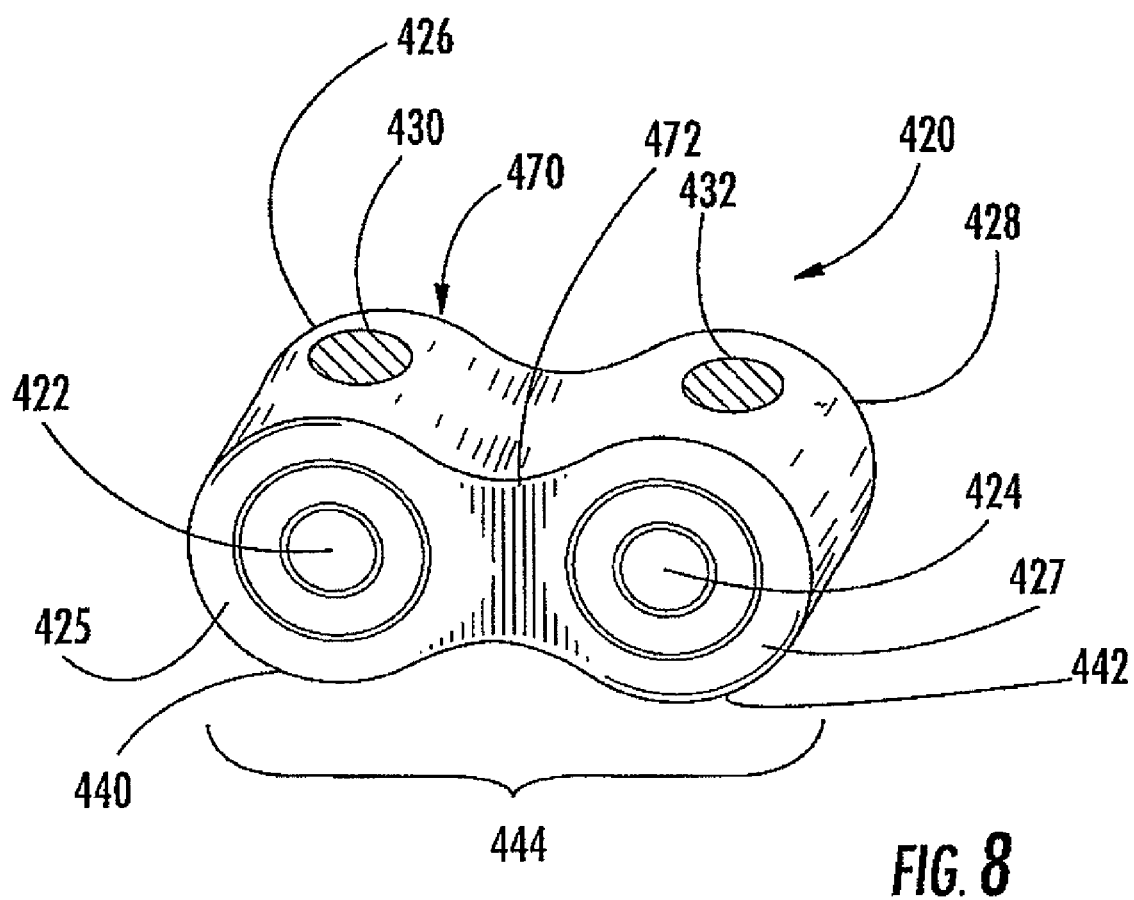
FIG. 8 is a schematic view illustrating a bi-lobal structure of unitary construction for a cooperative pair of photogrammetric targets.

In accordance with another exemplary construction consistent with this disclosure, a target assembly of substantially unitary construction may be provided. By way of example only, and not limitation, FIG. 8 illustrates an exemplary target assembly 420 of unitary construction wherein elements corresponding to those previously described are designated by like reference numerals within a 400 series. In the exemplary construction illustrated in FIG. 7, the first support pillar 426 and the second support pillar 428 form parts of a unitary body 470 such as may be formed by techniques such as molding, machining, electrical discharge machining "EDM" or the like. As shown, the unitary construction target assembly 420 provides a double lobed face structure 444, which may be used in contacting relation with a curved surface during evaluation. First support pillar 426 and Second support pillar 428 are adjoined by a reduced width intermediate neck portion 472. As illustrated, this intermediate neck portion 472 may have a substantially concave edge profile defining a saddle or detent between the lobes at the face structure 444 thereby yielding a unitary body structure of substantially dog-bone shape. Of course, the illustrated unitary construction is exemplary only and any number of other constructions may likewise be utilized as may be desired.

In practice, the use of constructions having substantial spans between support pillars as illustrated in FIG. 5, FIG. 6, and FIG. 7, may find particular application in measurement of surfaces having relatively modest degrees of curvature. In this regard, as the curvature of the surface being evaluated approaches a flat plane, it may be desirable to increase the distance between support pillars. Likewise, as the degree of curvature at the measurement surface increases, it may be of benefit to reduce or eliminate any span between the support pillars. In such environments of use, configurations such as those illustrated in FIGS. 2 and 8 may be useful.

INDUSTRIAL APPLICABILITY

The industrial applicability of the photogrammetric target assembly described herein will be readily appreciated from the foregoing discussion. The present disclosure is applicable to target assemblies adapted for use in photogrammetric evaluation of surfaces to determine and/or confirm surface contour characteristics.

In practice, a target assembly incorporating a pair of reflective targets disposed at terminal show surfaces of operatively connected and laterally-spaced support pillars is attached to a portion of a curved evaluation surface. The spaced support pillars may define a double lobed face structure to maintain contact with the curved evaluation surface. An imaging device is utilized to measure the positions of the reflective targets. The target assembly and associated measurement practices may be used in the evaluation of substantially convex curved surfaces such as the outer wall of a shaft or the like. The target assembly and associated measurement practices may also be used in the valuation of substantially concave curved surfaces such as the boundary wall of a borehole or the like. Multiple target assemblies may be used concurrently across the inner wall and outer wall of annular structures such as pipes and hollow shafts to evaluate conformance with sizing specifications.

It will be appreciated that the foregoing description provides examples of the disclosed system and technique. However, it is contemplated that other implementations of the disclosure may differ in detail from the foregoing examples. All references to examples herein are intended to reference the particular example being discussed at that point and are not intended to imply any limitation as to the scope of the disclosure or claims more generally. All language of distinction and disparagement with respect to certain features is intended to indicate a lack of preference for those features, but not to exclude such from the scope of the claims entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure contemplates the inclusion of all modifications and equivalents of the subject matter recited in the appended claims as permitted by applicable law. Moreover, any combination of the above-described elements in all possible variations thereof is contemplated unless otherwise indicated herein or otherwise clearly contradicted by context.

I claim:

1. A photogrammetric target assembly comprising:
a first photogrammetric target disposed at a terminal show surface of a first support pillar; and
a second photogrammetric target disposed at a terminal show surface of a second support pillar, wherein said first support pillar and said second support pillar are operatively connected in a predefined spatial relation, and wherein said first photogrammetric target is disposed in predefined lateral spaced relation to said second photogrammetric target.

2. A photogrammetric target assembly as recited in claim 1, wherein said first support pillar includes a body portion defining a first lobed surface and said second support pillar includes a body portion defining a second lobed surface, said first lobed surface and said second lobed surface cooperatively forming a double lobed face adapted for disposition in attached relation to a curved surface structure.

3. A photogrammetric target assembly as recited in claim 2, wherein at least one of said first support pillar and said second support pillar is substantially cylindrical.

4. A photogrammetric target assembly as recited in claim 2, wherein each of said first support pillar and said second support pillar is substantially cylindrical.

5. A photogrammetric target assembly as recited in claim 1, including a connector extending in bridging relation between surfaces of said first support pillar and said second support pillar.

6. A photogrammetric target assembly as recited in claim 5, wherein said connector is integrally molded into body portions of said first support pillar and said second support pillar.

7. A photogrammetric target assembly as recited in claim 6, wherein at least one of said first support pillar and said second support pillar is substantially cylindrical.

8. A photogrammetric target assembly as recited in claim 7, wherein each of said first support pillar and said second support pillar is substantially cylindrical.

9. A photogrammetric target assembly as recited in claim 1, including a displaceable connector disposed between said first support pillar and said second support pillar, said displaceable connector being adapted to engage one or more coupling members operatively connected to at least one said first support pillar and said second support pillar.

10. A photogrammetric target assembly as recited in claim 9, wherein said one or more coupling members is characterized by an adjustable operative length.

11. A photogrammetric target assembly as recited in claim 10, wherein each of said first support pillar and said second support pillar is substantially cylindrical.

12. A photogrammetric target assembly as recited in claim 9, wherein at least one of said first support pillar and said second support pillar is substantially cylindrical.

13. A photogrammetric target assembly comprising:
a first photogrammetric target disposed at a terminal show surface of a first support pillar; and
a second photogrammetric target disposed at a terminal show surface of a second support pillar, wherein said first support pillar and said second support pillar are portions of a unitary molded body construction, said photogrammetric target assembly further including a reduced diameter neck portion disposed in operatively connecting relation between said first support pillar and said second support pillar and wherein said first photogrammetric target is disposed in predefined lateral spaced relation to said second photogrammetric target.

14. A photogrammetric target assembly as recited in claim 13, wherein said reduced diameter neck portion is characterized by a substantially concave edge configuration and wherein said reduced diameter neck portion defines a depressed saddle intermediate said first support pillar and said second support pillar.

15. A method for measuring the contour of a curvilinear surface, the method comprising:
providing a structure having a curvilinear surface;
affixing at least one multi-target photogrammetric target assembly to said curvilinear surface, wherein said at least one photogrammetric target assembly comprises a first photogrammetric target disposed at a terminal show surface of a first support pillar and a second photogrammetric target disposed at a terminal show surface of a second support pillar, wherein said first support pillar and said second support pillar are operatively connected in a predefined spatial relation such that said first photogrammetric target is disposed in predefined lateral spaced relation to said second photogrammetric target; and
measuring the position of said first photogrammetric target and said second photogrammetric target.

16. The method for measuring the contour of a curvilinear surface as recited in claim 15, wherein a plurality of said multi-target photogrammetric target assemblies is affixed to said curvilinear surface.

17. The method for measuring the contour of a curvilinear surface as recited in claim 16, wherein said curvilinear surface is a concave surface.

18. The method for measuring the contour of a curvilinear surface as recited in claim 16, wherein said curvilinear surface is a convex surface.

19. The method for measuring the contour of a curvilinear surface as recited in claim 15, wherein a first plurality of said multi-target photogrammetric target assemblies is affixed to a first curvilinear surface of substantially concave surface structure and wherein a second plurality of said multi-target photogrammetric target assemblies is affixed to a second curvilinear surface of substantially convex surface structure.

* * * * *